United States Patent [19]

Bowey

[11] 4,320,317
[45] Mar. 16, 1982

[54] MOTOR OVERLOAD SAFETY DEVICE

[76] Inventor: John J. Bowey, Unit 2, 1 Hazel St., Ascot Park, State of South Australia, Australia

[21] Appl. No.: 132,526

[22] Filed: Mar. 21, 1980

[30] Foreign Application Priority Data

Mar. 23, 1979 [AU] Australia .............................. PD 8195

[51] Int. Cl.³ ............................................ H02K 11/00
[52] U.S. Cl. ............................... 310/68 B; 200/61.46; 308/189 R; 318/475; 340/671
[58] Field of Search ............... 318/457, 461, 465, 469, 318/470, 475, 476, 477; 310/68 R, 68 B; 200/61.39, 61.46; 340/665, 671, 672, 682; 308/188, 189 R

[56] References Cited

U.S. PATENT DOCUMENTS 2,526,373 10/1950 Le Clair ........................... 318/475 X
2,747,699 5/1956 Lucien ........................... 200/61.46 X

FOREIGN PATENT DOCUMENTS 45-39861 12/1970 Japan .............................. 200/61.39

Primary Examiner—J. V. Truhe
Assistant Examiner—Morris Ginsburg
Attorney, Agent, or Firm—Jay L. Chaskin

[57] ABSTRACT

A rotor of a motor has a bearing mounted thereon, the bearing having a tab which is urged in one direction by the fluid friction of the lubricant in the bearing, the tab being urged against a spring, the tab actuating a micro-switch. The force exerted by the tab on the spring is a function of the rotor speed. Upon reduction of rotor speed the spring urges the tab rearwardly so that the micro-switch open circuits in turn disconnecting power from the motor which comes to a standstill.

9 Claims, 5 Drawing Figures

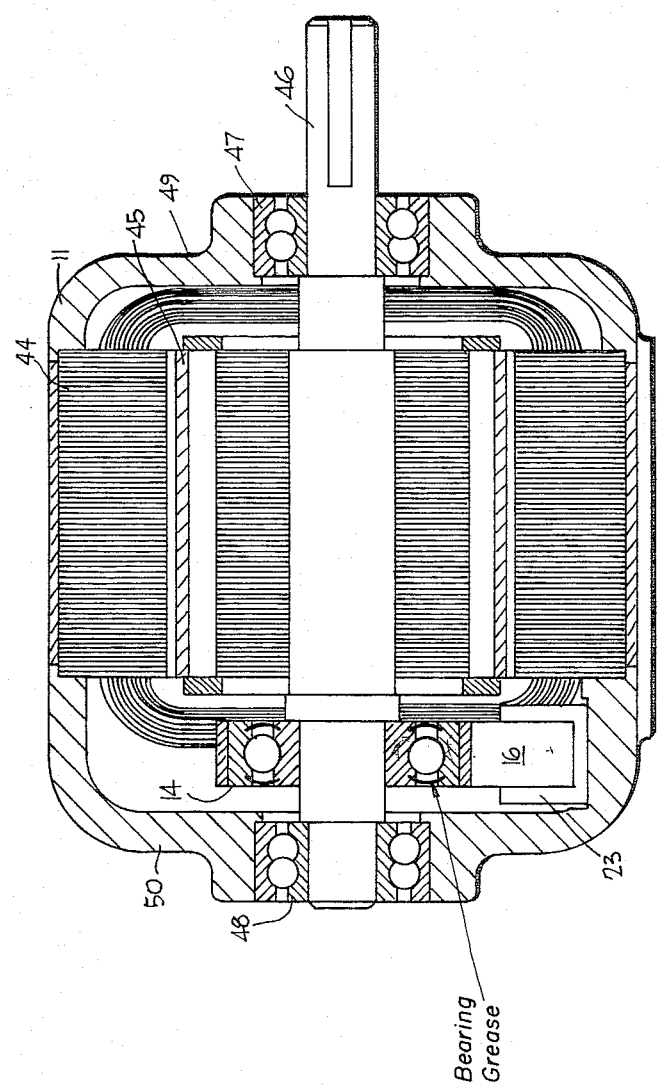

MOTOR OVERLOAD SAFETY DEVICE

This invention relates to an overload safety device which is responsive to reduction of angular velocity of a rotor in a motor which has a rotor journalled for rotation in bearings in a stator, and power means to induce said rotation.

BACKGROUND OF THE INVENTION

Overload devices are commonly used both in electrical and internal combustion motors, in electrical motors the overload devices being slow heating current sensors which deflect bi-metallic strips, or alternatively fuses or circuit breakers which change state upon sharp increase of current. Overload devices for internal combustion engines are more complex, and usually sense the fuel intake of the engines.

In both cases, overload conditions can exist which will result in a reduction of angular velocity of the rotor (which term includes crankshaft) and under some circumstances damage can be effected to the engine or motor without the overload devices functioning. Thus for example in the case of a vehicle engine, it is necessary for the fuel flow to be sufficient to supply short term high power requirements, and it is necessary for the overload condition to be sensed above that relatively large flow. In the case of an electric motor, a thermal overload device will not function to fully protect a motor under conditions of extreme cold, for example if the motor is operating under frosty or other very cold conditions.

In most instances however, both internal combustion motors and electric motors have overload conditions associated with loss of angular velocity, and the main object of this invention is to provide a safety device which is responsive to the reduction of angular velocity.

BRIEF SUMMARY OF THE INVENTION

Briefly in this invention, the rotor of a motor has a bearing mounted thereon, the bearing having an operator which is driven into engagement with a switch by the rotational force of the rotor imparted to the operator by the friction of the bearing. The operator movement however is resisted by the resilient return means, and the resilient return means is selected or adjusted such that upon loss of angular velocity of the rotor, the operator moves with respect to the switch to such a degree that the switch ceases to be actuated. The switch is arranged to control disconnection of the power means, for example to operate a solenoid to close the flow of disel fuel or to operate a relay to disconnect power to an electric motor. Thus under overload conditions a motor merely comes to a standstill condition.

With this invention, the device which is used can be extremely simple in construction, mechanical, can be mounted where it is readily accessible for maintenance purposes, and the device can be made substantially independent of temperature or extreme condition requirements. Its use provides additional safety, in that an operator is unlikely to be subjected to safety hazard when the motor reaches its standstill state.

More specifically, in this invention a safety device responsive to reduction of angular velocity of a rotor in a motor which has a rotor journalled for rotation in bearings in the stator, and power means to induce said rotation, comprises bearing means freely rotatable on and carried by the rotor, said bearings means having an operator thereon, switch means arranged to be actuated by the operator by rotational force of the rotor imparted to the operator by friction of the bearing means, and resilient return means engaged by the operator and operable to release the operator from the switch actuation upon reduction of the bearing friction occasioned by reduction of rotor angular velocity, the switch controlling disconnection of the power means upon release from switch actuation.

Conveniently the bearing means can be a ball or roller race of a sealed type containing a grease of so-called "constant viscosity" type, wherein the viscosity of the grease varies by only a limited amount with variation of temperature. The operator can conveniently be a cam, but is preferred to be a tab or finger carried on the outer race of the bearing. The resilient return means can merely be the return spring of a micro-switch. The micro-switch can be directly connected to the motor in the case of a small electric motor, or can be arranged to operate a relay or solenoid in the case of a larger electric motor, or diesel engine or petrol engine.

BRIEF DESCRIPTION OF THE DRAWINGS

Three embodiments of the invention are described hereunder in some detail with reference to and are illustrated in the accompanying drawings in which FIG. 5 is an elevational section through an electric motor wherein the safety device is contained within the motor housing.

DETAILED DESCRIPTION OF THE PREFERRED EMBODIMENTS

It will be clear to those skilled in the art that the invention is equally as well applied to an internal combustion engine, but the embodiments described herein are restricted to electric motors.

Figure 1:
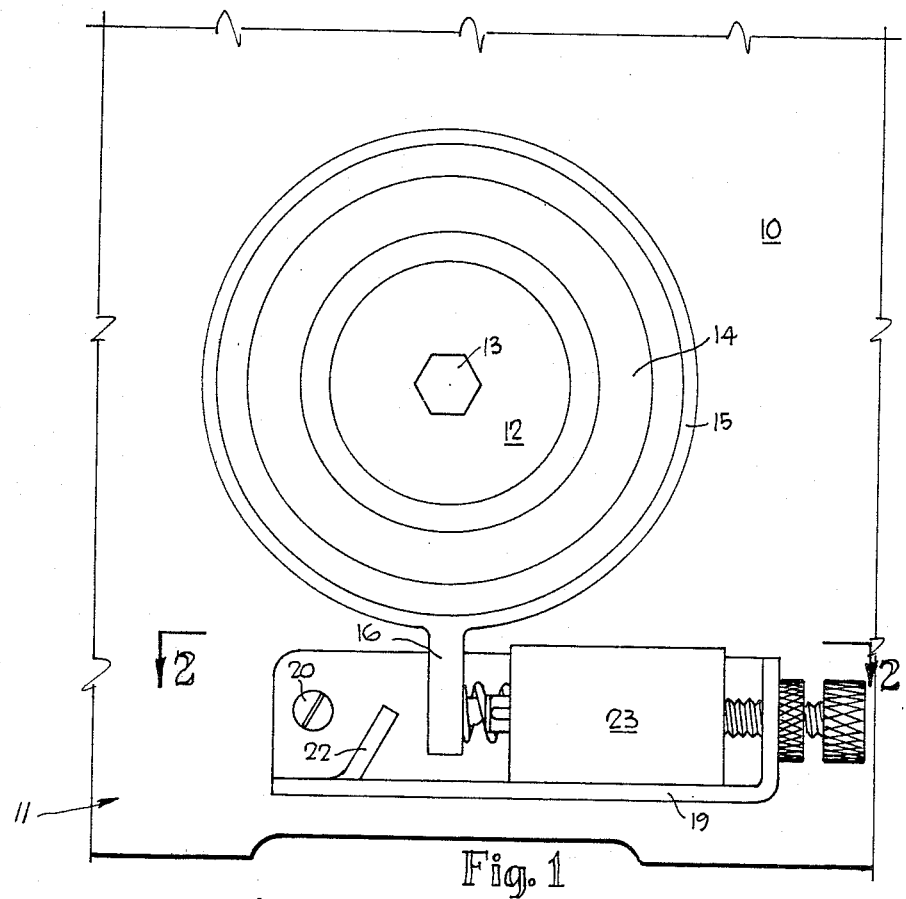
FIG. 1 is an enlarged fragmentary end elevation of a safety device for the protection of a small electric motor.
Figure 2:
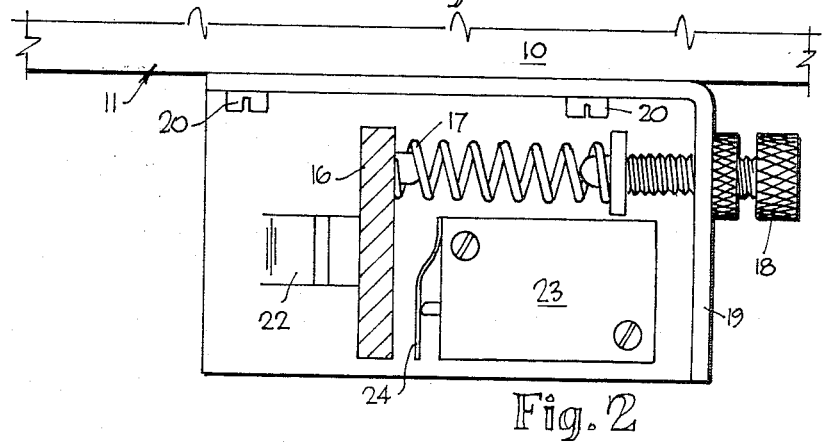
FIG. 2 is a fragmentary section taken on line 2—2 of FIG. 1.
Figure 3:
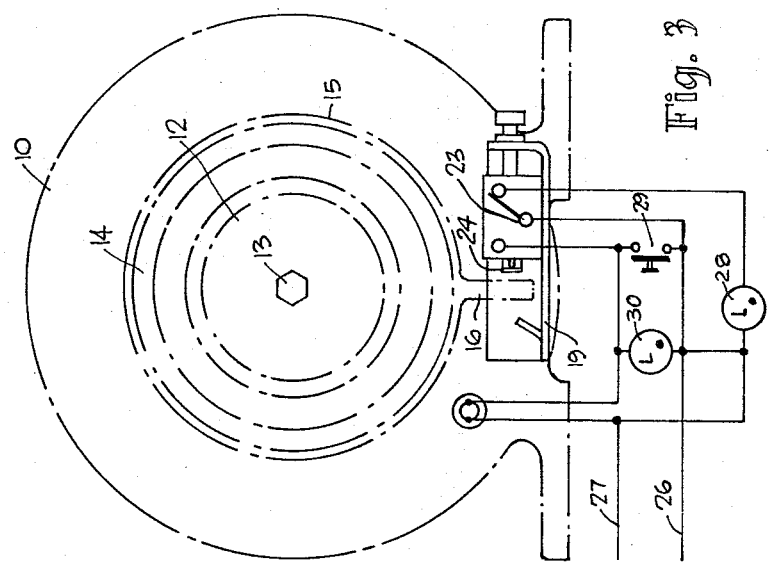
FIG. 3 is an electrical circuit diagram showing the manner in which the safety device switch controls disconnection of power to the motor of FIG. 1.

In the first embodiment of FIGS. 1, 2 and 3, an electric motor 10 has a motor housing 11 containing bearings (not shown) in which are journalled a rotor (also not shown). However the rotor carries on its end a boss 12 which is centrally bored, and retained on the end of the rotor with a locking bolt 13. The boss 12 has fitted to it the inner race of a sealed ball race 14, while the outer race of the sealed ball race 14 carries a sleeve 15 having an operator 16 depending from it, the operator 16 being a depending tab.

As shown best in FIG. 2, the depending tab 16 engages a resilient return spring 17, and the resilient return force is adjusted by means of an adjusting screw 18. This adjusting screw 18 is threadably engaged in a bracket 19 which is fixed to the motor 11 housing by means of screws 20. The bracket 19 is also provided with an upstanding stop 22 which limits clockwise rotation of the sleeve 15, and carries a switch 23 which in this embodiment is a micro-switch, the tab 16 engaging the leaf arm 24 of switch 23.

As shown in FIG. 3, the micro-switch 23 is in the active line 26 of a power supply, and its normally open contacts disconnect the windings of motor 10 from the active line, the neutral line 27 being connected to the motor 10 through the main power switch as in the ordinary way. When power is applied, the "fault lamp" 28 is illuminated (via line 26, n.c. contacts of switch 23, lamp 28 and line 27) until such time as the push button 29 is depressed to start the motor running. When the motor has reached speed, the micro-switch 23 is actuated by the operator 16, and thereupon the push button 29 can be released, the "fault lamp" 28 becomes open-circuited by the opening of the normally closed contacts of the micro-switch 23, and the "safe run" lamp 30 becomes illuminated (via line 26, closed contacts of switch 23, lamp 30 and line 27).

Since use is made of a ball race 14, under normal conditions the friction of that race will vary only slightly with increased speed. However the ball race 14 is, as said, packed with a grease having relatively constant viscosity characteristics, and thus the friction increases rapidly with speed due to the fluid friction of the grease being displaced by the elements of the ball race. As the fluid friction increases with speed, the operator 16 is retained in engagement with the leaf arm 24, but increase of load on the motor 10 will cause a reduction of speed, to which the rotor current will be approximately proportional over the useful range. This can be quite accurately adjusted in this invention, and on overload conditions being reached, the speed reduces to a point where the friction in the ball race 14 is so small that the operator tab is urged by the spring of switch 23 and also the spring 17 away from the micro-switch by a sufficient amount that the switch ceases to be actuated, thereby returning to the conditions shown in FIG. 3 until such time as the press button 29 is again depressed. At the same time, the "safe run lamp" 30 extinguishes and "fault lamp" 28 illuminates.

Figure 4:
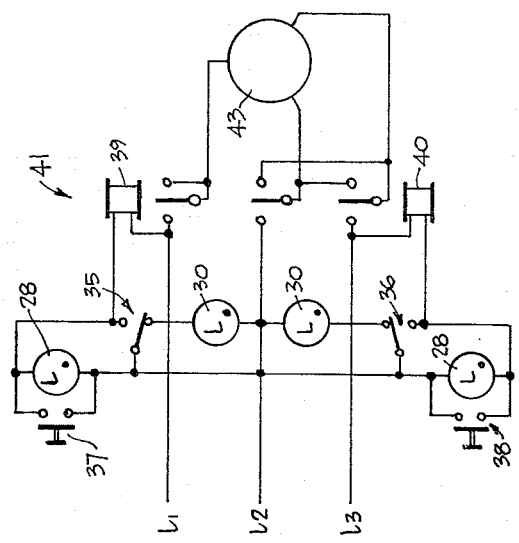
FIG. 4 is an electrical circuit diagram showing the manner in which the safety device can be used for a reversing three phase motor.

The invention can of course be extended to use on reversing motors, and in FIG. 4 there is shown an electrical circuit wherein use is made of two micro-switches respectively designated 35 and 36, each similarly associated with respective push buttons 37 and 38, and each micro-switch/push button assembly actuating a respective electromagnet 39 or 40 of a reversing relay 41. As in the first embodiment, the "fault lamps" are designated 28 and lie across the respective push buttons 37 and 38, and the "safe run" lamps 30 become illuminated upon energising of the respective relay electromagnet 39 or 40. In other respects the wiring of the motor 43 is in accordance with known art.

The third embodiment of FIG. 5 shows the electric motor 10 having a stator 44 and a rotor 45 carried on a shaft 46 journalled in bearings 47 and 48 in respective end plates 49 and 50. The sealed ball race 14 is carried on shaft 46, and its outer race carries operator 16 on sleeve 15 as in the first embodiment, operator 16 cooperating with micro-switch 23. However, micro-switch 23 is itself carried by end plate 50, and is partly or wholly contained within the housing of motor 10. This affords some protection to the safety device. In other respects the arrangement is similar to that of FIG. 1.

The invention of course is not limited to the use of a ball race 14 or any other type of race (for example a roller race), but use can also be made of a sleeve-type bearing having a high degree of response to fluid friction. If desired, use may be made of impeller plates or other types of plates within the bearing 14 to make it even more responsive to fluid friction. Furthermore, the ring 15 can have associated with it an "over centre" spring which causes it to snap into engagement with the micro-switch 23 or away from engagement with that switch, thereby providing a snap action for the mechanism. It may be noted that for a ball race 14 having an outside diameter of about 50 mm, the load imparted by the operator 16 can be between 15 and 50 grams, whereas the load required to actuate the micro-switch is only about ½ gram. It will thus be seen that a wide safety range exists, and the device is found to function even when the bearing loses some of its grease. However, this is most unlikely to occur owing to the very light load imparted to the bearing.

Various modifications in structure and/or function may be made by one skilled in the art to the disclosed embodiments without departing from the scope of the invention as defined by the claims.

I claim:

1. A motor safety device overload responsive to reduction of angular velocity of a rotor in a motor, which has a rotor having a shaft journalled for rotation in bearings in a stator, and power means to induce said rotation, comprising:
   bearing means providing bearing friction and being freely rotatable on and carried by the rotor, said bearing means having an operator thereon,
   switch means arranged to be actuated by the operator by rotational force of the rotor imparted to the operator by said friction of the bearing means,
   and resilient return means engaged by the operator and operable to release the operator from said switch means actuation upon reduction of said bearing friction occasioned by reduction of rotor angular velocity,
   said switch means controlling disconnection of said power means upon said release from said switch means actuation.

2. A safety device responsive to reduction of angular velocity of a rotor in a motor according to claim 1, wherein said bearing means is a race, and contains a grease having a small viscosity variation for a large temperature variation, said bearing friction including the fluid friction of the grease.

3. A safety device responsive to reduction of angular velocity of a rotor in a motor according to claim 2 wherein said operator comprises a sleeve on an outer race of the bearing race, and a tab extending outwardly from the sleeve, said tab engaging said switch means to actuate it.

4. A safety device responsive to reduction of angular velocity of a rotor in a motor according to any one of claims 1 or 2 or 3 wherein said resilient return means includes a return spring within said switch means.

5. A safety device responsive to reduction of angular velocity of a rotor in a motor according to claim 1 wherein said operator comprises a sleeve on an outer race of a bearing race, a tab extending outwardly from the sleeve, said tab engaging said switch means to actuate it, and further comprising a return spring having one end operatively connected to said tab to be deflected by movement of said tab.

6. A safety device responsive to reduction of angular velocity of a rotor in a motor according to claim 5 further comprising an adjustment screw operatively connected to the other end of said return spring, and arranged to vary the pressure of said return spring against said tab upon adjustment of said screw.

7. A safety device responsive to reduction of angular velocity of a rotor in a motor according to any one of claims 1 or 2 or 3 or 5 or 6 wherein said switch means is in a circuit of a relay which controls power supply to said motor.

8. A safety device responsive to reduction of angular velocity of a rotor in a motor according to claim 1 wherein said rotor and stator are contained in a motor housing, and further comprising means securing the bearing means to the rotor with the bearing means being external of the motor housing, a bracket on the motor housing, and means securing said switch means to said bracket.

9. A safety device responsive to reduction of angular velocity of a rotor in a motor according to claim 1 wherein said rotor and stator are contained in a motor housing, and wherein said bearing means is carried on a shaft of the rotor within the housing, and said switch means is contained in said housing.

* * * * *